United States Patent [19]
Nishimura

[11] Patent Number: 5,150,680
[45] Date of Patent: Sep. 29, 1992

[54] INTERNAL COMBUSTION ENGINE CONTROL METHOD AND APPARATUS

[75] Inventor: Yutaka Nishimura, Katsuta, Japan

[73] Assignee: Hitachi, Ltd., Tokyo, Japan

[21] Appl. No.: 661,477

[22] Filed: Jan. 29, 1991

[30] Foreign Application Priority Data

Feb. 2, 1990 [JP] Japan .................................. 2-22025

[51] Int. Cl.$^5$ .................... F02D 41/18; F02P 5/15; F02M 25/07
[52] U.S. Cl. .................... 123/399; 123/416; 123/478; 123/571
[58] Field of Search ............ 123/361, 399, 478, 571, 123/416, 417, 403

[56] References Cited

U.S. PATENT DOCUMENTS

| | | | |
|---|---|---|---|
| 4,524,745 | 6/1985 | Tominari et al. | 123/399 X |
| 4,759,329 | 7/1988 | Nobuo et al. | 123/399 X |
| 4,771,752 | 9/1988 | Nishimura et al. | 123/399 X |
| 5,014,668 | 5/1991 | Klenk et al. | 123/399 |

Primary Examiner—Tony M. Argenbright
Attorney, Agent, or Firm—Antonelli, Terry, Stout & Kraus

[57] ABSTRACT

This specification discloses an internal combustion engine control system which meets two conflicting performance requirements in the automotive internal combustion engine. In the control system according to this invention, the operation of the throttle valve is controlled such that the opening angle of the throttle valve of an internal combustion engine changes according to the travel amount of the accelerator pedal in the range from the minimum value to a predetermined value less than the maximum value of the accelerator pedal travel amount of the automobile, and that the throttle valve becomes full open in the range from the predetermined value to the maximum value of the accelerator pedal travel amount. The air-fuel ratio is controlled such that an air-fuel mixture of a first air-fuel ratio is supplied in the range from the minimum value to the predetermined value of the accelerator pedal travel amount, and an air-fuel mixture of a second air-fuel ratio is supplied in the range from the predetermined value to the maximum value of the accelerator pedal travel amount.

15 Claims, 12 Drawing Sheets

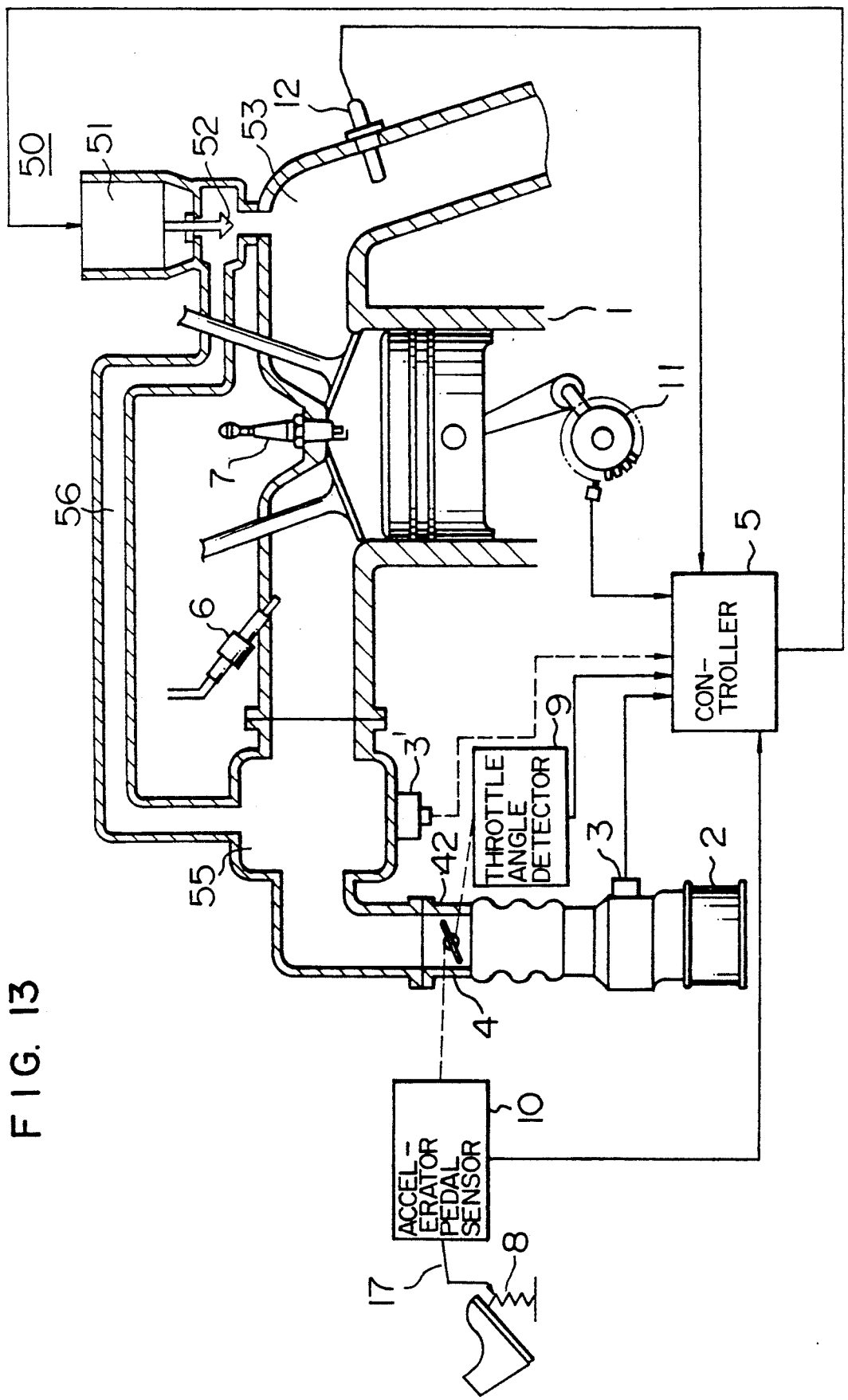

ID-NAL COMBUSTION ENGINE CONTROL
METHOD AND APPARATUS

FIELD OF THE INVENTION

This invention relates to control method and apparatus of an internal combustion engine, and more particularly to a new control apparatus of an internal combustion engine suitable for reducing fuel consumption and NOx (nitrogen oxide).

Automotive engines are required to meet two requirements of low fuel consumption and high output, and are constructed such that while the throttle valve is at a low opening angle to a medium opening angle, an economical mixture or a lean mixture is supplied to reduce fuel consumption and when the throttle valve is wide open, a rich mixture of a power air-fuel ratio is supplied to develop the maximum horse power required. In the latter process, to prevent the engine output torque from changing suddenly relative to the travel amount of the accelerator pedal, an air-fuel ratio control curve is set which is used to gradually enrich the lean mixture to a rich mixture well before the throttel reaches the fully-opened position. For this reason, the throttle opening range in which a lean mixture can be supplied is limited. Therefore, the range of supplying a rich mixture richer than a lean mixture occupies the operation range from a throttle valve opening angle well before full open to the full-open state, with the result that the operation range with a lean mixture is narrowed.

However, to reduce fuel consumption, it is necessary to decrease the operation range of a rich mixture, and expand the operation range of a lean mixture. At the same time, since the maximum horse power required must be maintained, the need to supply a rich mixture of the output air-fuel ratio must be satisfied.

In addition, in order to reduce NOx (nitrogen oxides), a harmful ingredient of the exhaust gas, exhaust gas recirculation (EGR) is performed in many automotive internal combustion engines. Normally, the greatest amount of recirculation gas (hereafter referred to as EGR amount) is fed for EGR in the medium load operation range, but EGR is not performed in the maximum power operation range. Therefore, in the operation range from about a half-open position well before full open to full open of the throttle, EGR amount is controlled so that the EGR amount is reduced gradually to zero when the throttle is opened fully. Consequently, the range in which a lesser EGR amount is fed occupies the operation range from a throttle opening angle well before full open till full open. So, the operation range in which EGR is performed sufficiently is narrowed, and as a result, the reduction of NOx is insufficient.

To reduce NOx, it is necessary to expand the operation range by a relatively large EGR amount. Since the maximum power required must be maintained at the same time, the requirement that the EGR amount is to be zero when the throttle is full open must be met.

A first object of this invention is to solve the above problems and provide internal combustion engine control method and apparatus which reduce fuel consumption and attain the maximum power required at the same time.

A second object of this invention is to solve the above problems and provide internal combustion engine control method and apparatus which reduce NOx and attain the maximum power required.

SUMMARY OF THE INVENTION

This invention provides a novel internal combustion engine control system which meets the two conflicting performance requirements of automotive internal combustion engines.

In a new control system according to this invention, in the range of accelerator pedal travel amount from the minimum value to a specified value smaller than the maximum value, the opening angle of the throttle valve of an internal combustion engine changes according to the travel amount of the accelerator pedal. On the other hand, in the range from the specified value to the maximum value of accelerator pedal travel amount, the throttle valve is arranged to open fully.

In order to achieve the first object, the fuel flow is controlled so that in the range from the minimum value to the specified value of accelerator pedal travel amount, a mixture of a first air-fuel ratio is supplied, while in the range from the specified value to the maximum value, a mixture of a second air-fuel ratio different from the first air-fuel ratio is supplied.

In addition, to achieve the second object, in the range from the minimum value to the specified value of the accelerator pedal travel amount, the EGR amount is decided according to values of an intake air amount and an engine speed, while in the range from the specified to the maximum value, the EGR amount is decided according to values of an accelerator pedal travel amount and the engine speed.

In the internal combustion engine control method according to an embodiment of this invention, in the throttle valve opening range from a low opening angle to full open, a lean mixture of a first air-fuel ratio is supplied to the engine, and in the range from throttle full open till the accelerator pedal is further depressed to the maximum amount, a rich mixture richer than the first air-fuel ratio is supplied. By implementing control as described, the operation range by a lean mixture can be increased up to the throttle full-open state, so that fuel consumption can be reduced. Furthermore, at a point where the accelerator pedal travel amount is the maximum value, a rich mixture of the output air-fuel ratio is supplied, which enables the required maximum power of the engine to be achieved.

In addition, by the control method according to another embodiment of this invention, in the throttle opening range from a low opening angle to full open, ordinary EGR amount control is performed, and in the range from full open until the accelerator pedal is further depressed to the maximum amount, the EGR amount is reduced gradually to a smaller amount than in the ordinary control, so that EGR can be performed sufficiently until the throttle opens fully. Meanwhile, at a point where the accelerator pedal travel amount is the maximum value, the EGR amount is reduced to zero, so that the required maximum power of the engine can be achieved.

Moreover, in a high load operation range near the full-open state of the throttle, control methods according to embodiments of this invention use a greater throttle opening angle to obtain the same output torque than in conventional automotive engines. Therefore, a pumping loss of the engine is reduced and the engine thermal efficiency is improved, accordingly, and the improved thermal efficiency decreases fuel consumption.

BRIEF DESCRIPTION OF THE DRAWINGS

FIG. 13 is a still another embodiment of the control system of this invention:

DESCRIPTION OF THE PREFERRED EMBODIMENTS

Internal combustion engine control method and system of this invention will be described with reference to the accompanying drawings.

Figure 1:
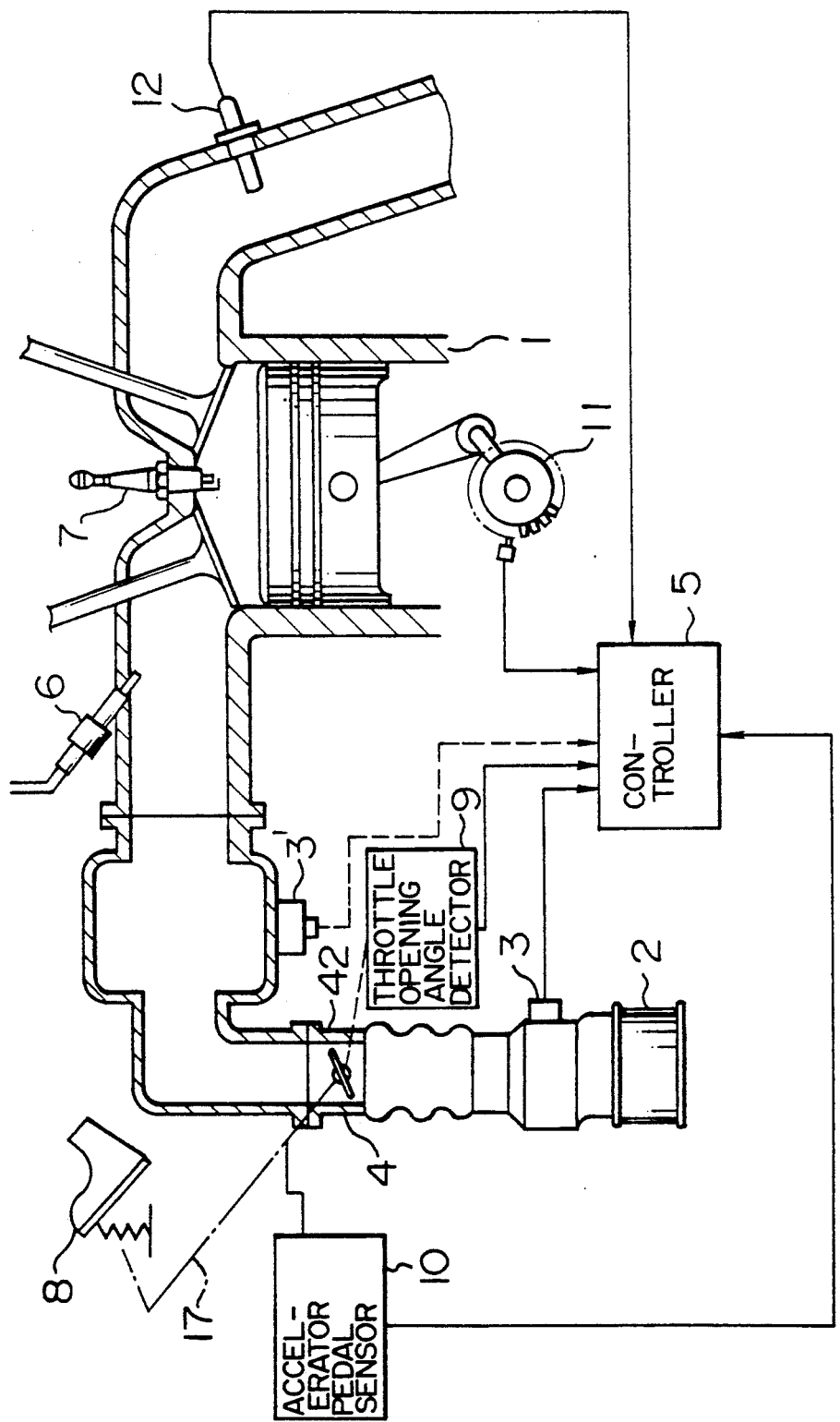
FIG. 1 is a system diagram, partly in cross section. showing a concrete example of a system in which a method according to this invention is applied.

An internal combustion engine control system according to an embodiment of this invention, shown in FIG. 1, comprises an engine 1, an air cleaner 2, a throttle valve 4 mounted to a throttle chamber 42, a controller 5 including a microcomputer for deciding a fuel injection amount and ignition timing, an output control mechanism shown represented by an accelerator pedal 8, a throttle valve drive mechanism shown represented by an accelerator wire 17, a fuel injection system represented by a fuel injection valve 6, an ignition system represented by an ignition plug 7, an air flow meter 3 mounted on the air outlet side of the air cleaner 2, a throttle opening angle detector 9 for detecting a throttle opening angle, an accelerator pedal sensor 10 for detecting an accelerator travel amount, and an engine speed detector 11. Incidentally, instead of the air flow meter 3, an intake pressure meter 3' may be provided on the air outlet side of the throttle chamber 42. Reference numeral 12 indicates an $O_2$ sensor for detecting an air-fuel ratio, mounted to an exhaust pipe. Output of the $O_2$ sensor is given to the controller 5 and used in deciding a fuel injection amount.

Figure 2A:
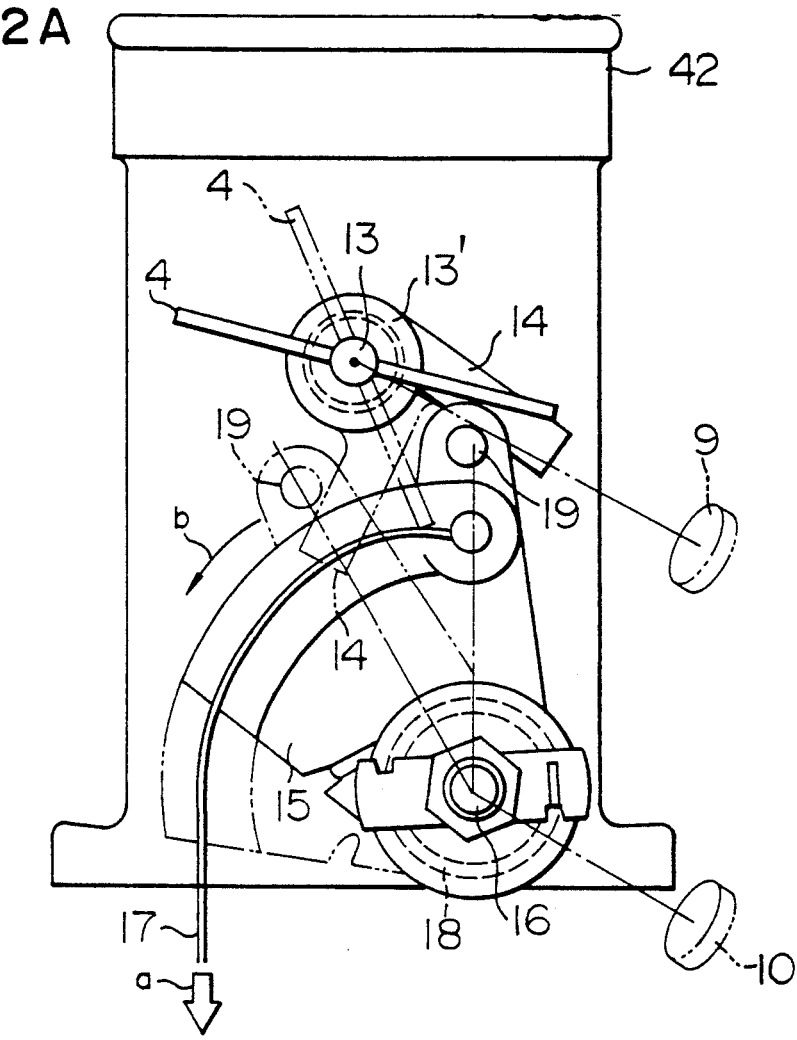
FIGS. 2A and 2B respectively show the construction of the interior of the throttle chamber and throttle drive characteristics.
Figure 2B:
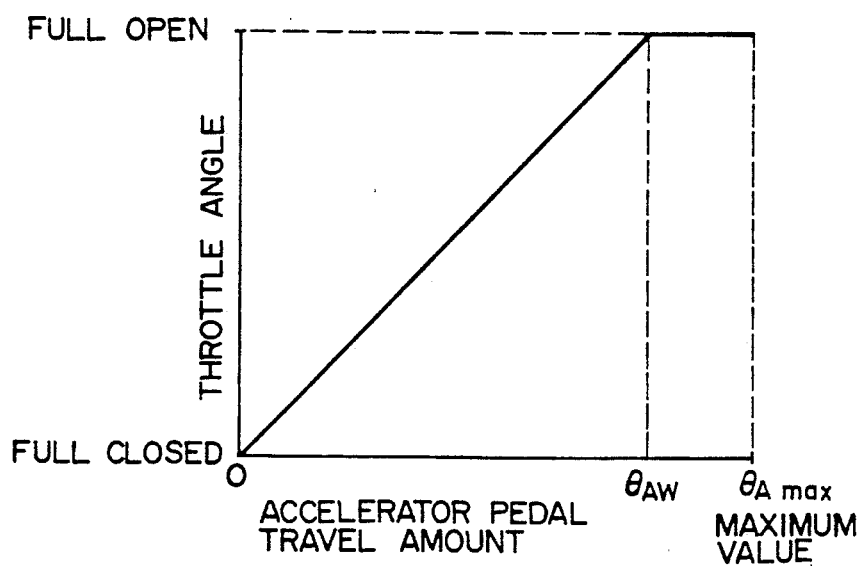

With reference to FIGS. 2A and 2B, description will now be made of the construction of the throttle valve 4 and the throttle valve drive mechanism 17 in the throttle chamber 42, which are important characteristics of this invention.

For the throttle valve 4, a butterfly type valve is used. As shown in FIG. 2A, the throttle valve drive mechanism 17 comprises a torsion spring 13', provided around the periphery of the throttle shaft 13 of the throttle valve 4 and urging the throttle valve in the direction of opening the valve 4, a lever 14 connected in one body with the throttle shaft 13, a drum shaft 16 fixed in parallel with the valve shaft 13, an accelerator link drum 15 mounted rotatably around the periphery of the drum shaft 16, a pin 19 provided at a position of the accelerator drum 15 where the pin 19 can contact the lever 14, an accelerator wire 17 connecting the accelerator pedal 8 of FIG. 1 and the accelerator link drum 15 of FIG. 2A, a return spring 18 provided around the drum shaft 16 and, while rotating itself. urging the accelerator link drum 15 in the direction of bringing the drum 15 back, and a stopper (not shown) for preventing the throttle valve 4 from rotating further after the throttle valve 4 is opened to the full-open state. As for the operation of this throttle valve drive mechanism, when the accelerator pedal 8 is depressed down, the accelerator wire is pulled in the direction of the arrow a in FIG. 2A, the accelerator link drum 15 rotates in the direction of the arrow b in FIG. 2A against the pressure of the return spring 18, the pin 19 provided on the accelerator link drum 15 moves similarly in the direction of the arrow b, that is, in the direction of going away from the lever 14, and in concurrence with this movement, the throttle valve 4 is rotated clockwise by the pressure of the torsion spring 13 through the intermediary of the valve shaft 13, thereby opening the throttle valve 4. Conversely, when the accelerator pedal 18 is released, the accelerator link drum 15 rotates in the direction opposite that of the arrow b, the pin 19 on the accelerator link drum 15, too, moves in the direction opposite that of the arrow b, and pushed by the pin 19, the lever 14 moves counterclockwise against the pressure of the torsion spring 13, and in concurrent with this movement, the throttle valve 4 rotates counterclockwise through the intermediary of the valve shaft 13, so that the throttle valve is closed. This throttle valve drive mechanism is constructed such that after the throttle valve is opened fully and fixed to the full-open state by the stopper (not shown), the accelerator pedal 8 can be depressed down to a predetermined maximum value of the accelerator travel amount.

As shown in FIG. 2A, the throttle valve opening angle $\theta_{th}$ indicator 9 is attached to the valve shaft 12, detects a throttle valve opening angle $\theta_{th}$, and the detected value is sent to the controller 5 shown in FIG. 1.

As shown in FIG. 2A, the accelerator pedal sensor 10, attached to the drum shaft 16, detects an accelerator travel amount $\theta_A$ and the detected value, too, is sent to the controller 5.

FIG. 2B shows a throttle valve drive characteristics of the throttle valve drive mechanism constructed as shown in FIG. 2A. The throttle valve opening angle of the axis of ordinates increases from the fully closed state in proportion to an increase in the accelerator pedal travel amount of the axis of abscissas, and the throttle valve is fully opened at a predetermined value $\theta_{AW}$ before the accelerator pedal travel amount reaches the maximum value $\theta_{Amax}$. In the range from the predetermined value $\theta_{AW}$ until the maximum value $\theta_{Amax}$ of the accelerator pedal travel amount, the throttle valve stays fully opened. The predetermined value $\theta_{AW}$ is decided according to the type of engine so that the output torque rises along a smooth increasing trend. For example, a value about $\frac{2}{3}$ of the maximum value $\theta_{Amax}$ is selected as a predetermined value $\theta_{AW}$.

Figure 3:
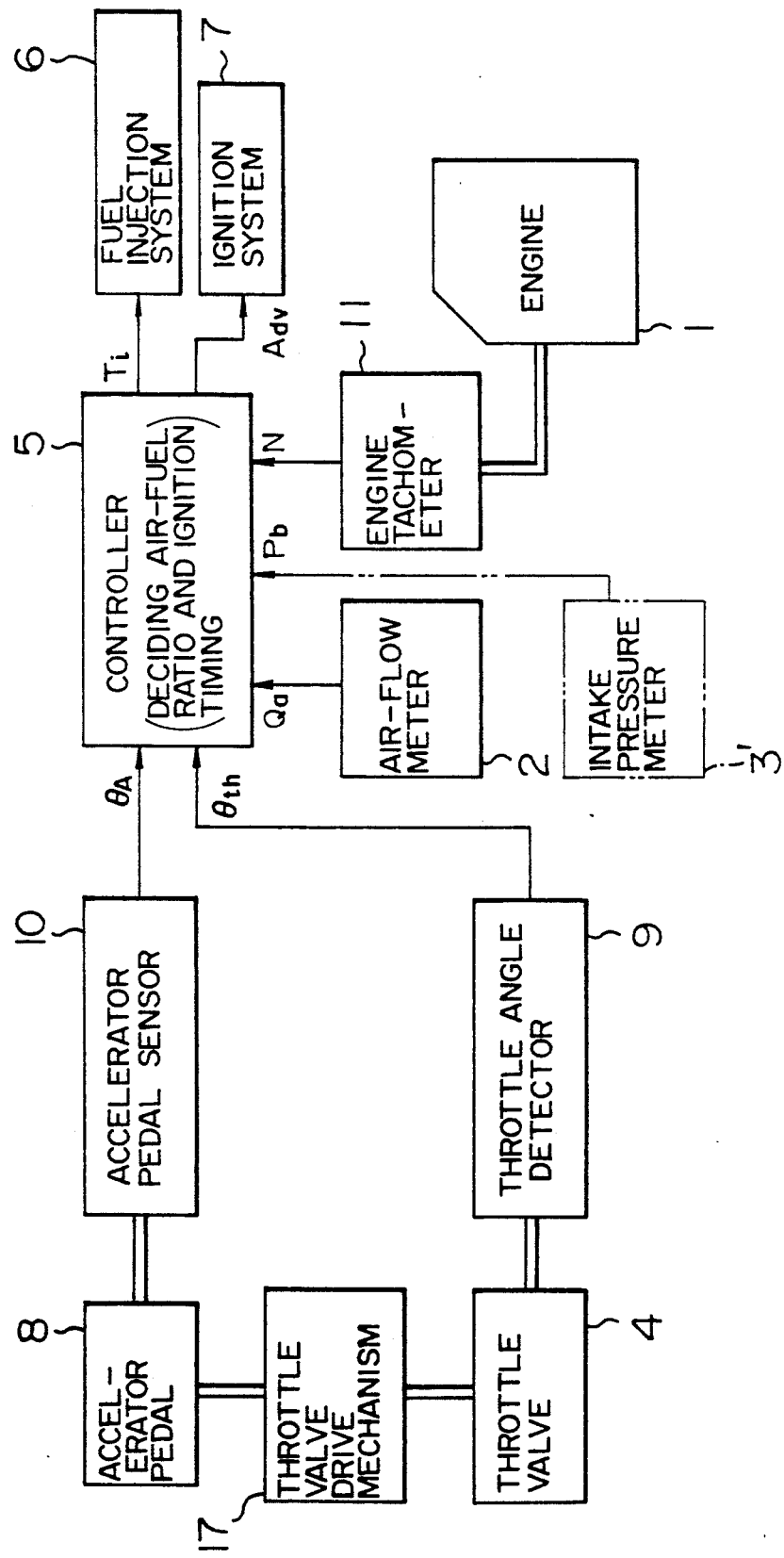
FIG. 3 is a block diagram for showing an embodiment of this invention.

FIG. 3 is a block diagram of an embodiment, shown in FIG. 1, of the internal combustion engine control method according to this invention.

In this embodiment, the accelerator pedal sensor 10, attached indirectly to the accelerator pedal 8, detects an accelerator pedal travel amount $\theta_A$ the detected value is sent to the controller 5.

On the other hand, the throttle opening angle indicator 9, which is attached to the throttle valve 4 connected to the accelerator pedal 8 through the intermediary of the throttle valve drive mechanism 17, detects a throttle opening angle $\theta_{th}$ and the detected value is sent to the controller 5.

The air flow meter 3 detects an intake air flow $Q_a$ and the detected value is sent to the controller 5. Instead of using the air flow meter 3, the intake pressure meter 3' may be used to detect an intake pressure $P_b$ and send the detected pressure to the controller 5.

And, an engine tachometer 11, attached to the engine, detects an engine speed N and the detected value is sent to the controller 5.

The controller 5 receives an accelerator travel amount $\theta_A$ from the accelerator pedal sensor 10, a throttle opening angle $\theta_{th}$ from the throttle opening angle indicator $\theta_{th}$, and an intake air flow $Q_a$, performs arithmetic operations, and sends a command to the fuel injection system 6 directing it to supply a lean mixture (of air-fuel ratio of about 18 to 25, for example) when the throttle valve is operated in the operation range from a low opening angle to full open. In the operation range after the throttle valve 4 is fully opened and while the accelerator pedal is further depressed down, the controller 5 sends a command to the fuel injection system 6 directing it to increase the mixed proportion of fuel in the mixture according to a detected value $\theta_A$ from the accelerator pedal sensor 10. Then, the controller 5 receives an intake air flow $Q_a$ from the air flow meter 3 and an engine speed N from the engine tachometer 11, decides an ignition timing Adv from intake air flow $Q_a$/engine speed N and the engine speed N, and sends an ignition signal to the ignition system 7.

As shown in FIG. 1, the air flow meter 3 detect an intake air flow $Q_a$ on the air outlet side of the air cleaner 2, and the detected value, too, is sent to the controller 5. When an intake pressure meter 3' is used instead of the air flow meter 3, the air pressure meter 3' detects an intake pressure $P_b$ on the air outlet side of the throttle chamber 42, and this detected value, too, is sent to the controller 5 as shown in FIG. 1.

As presented in FIG. 1, the engine tachometer 11 is attached to the crank shaft, detects an engine speed N, and this detected value is sent to the controller 5.

Figure 4:
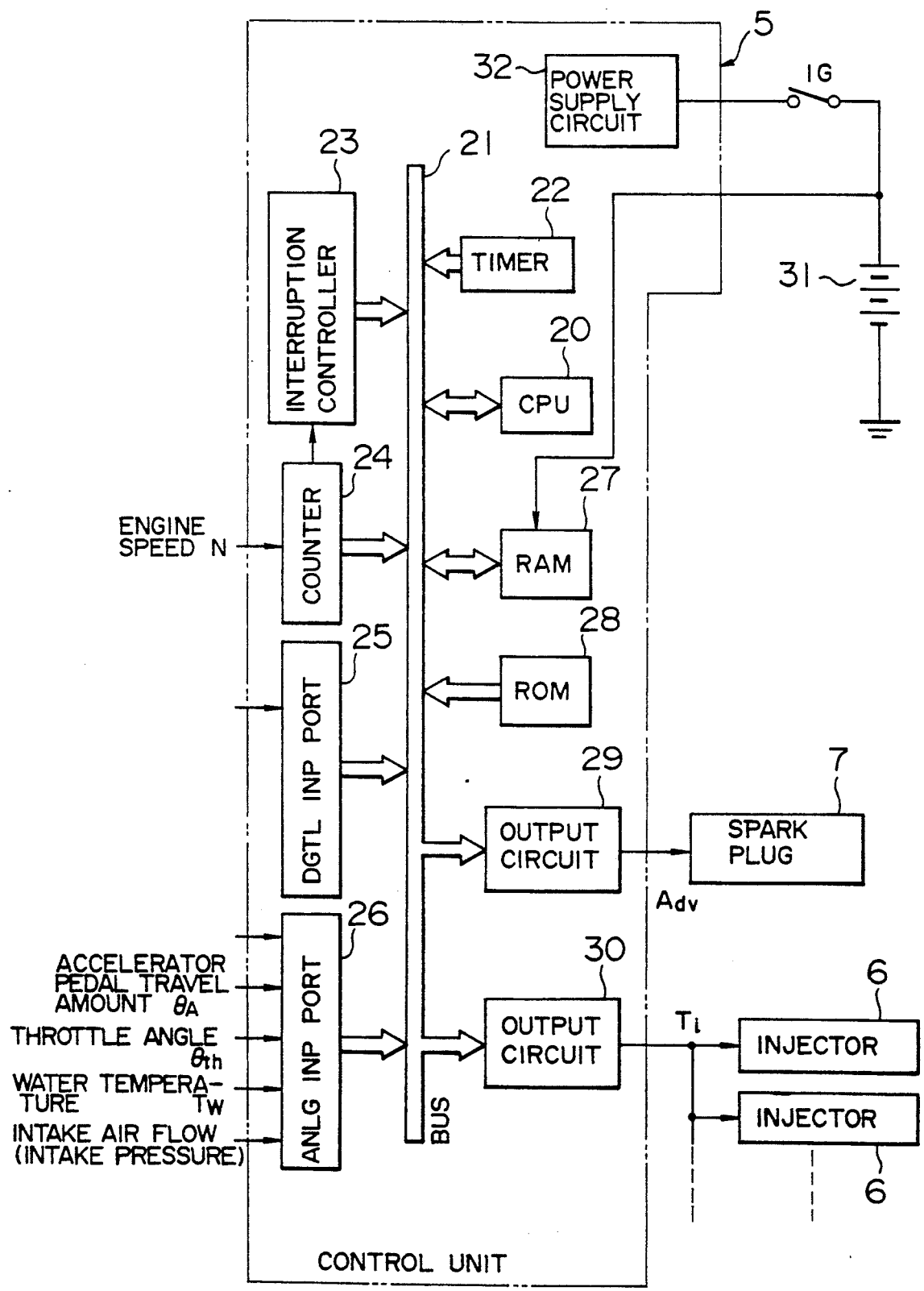
FIG. 4 is a block diagram showing an internal logic of the controller of the system.

As FIG. 4 shows, in the controller, there are arranged a CPU 20 which is a microprocessor, a bus 21 for transfer of signals between the devices and circuits, a timer 22, an interrupt controller 23, a revolution number counter 24, a digital input port 25, an analog input port 26, a RAM 27, a ROM 28, and output circuits 29, 30. A battery 31 is provided outside the controller 5. Reference numeral 32 indicates a power source to supply voltages to various parts of the controller 5.

The CPU 20 performs arithmetic operations of an air-fuel ratio A/F, actual fuel injection amount $T_i$, ignition timing Adv, correction value $\alpha$, etc., and sends operation results to the specified parts.

The revolution counter 24 counts the engine speed N.

The RAM 27 stores data on two-dimensional tables shown in FIGS. 6, 7, 8 and 9.

The ROM 28 serves to read data stored in the RAM 27.

The analog input port 26 is used to receive an accelerator pedal travel amount $\theta_A$, throttle opening angle $\theta_{th}$, cooling water temperature $T_w$, intake air flow $Q_a$ or intake pressure $P_b$.

The output circuit 29 is connected to the ignition system 7 represented by the ignition plug.

The output circuit 30 is connected to the fuel injection system 6 represented by the fuel injection valve.

The battery 31 supplies power for operation to the controller 5 when a key switch IG is turned on. Incidentally, power is always supplied by the battery 31 to the RAM 27.

Description will now be made of an example of the internal combustion engine control method in relation to the operation of the controller 5.

Figure 5:
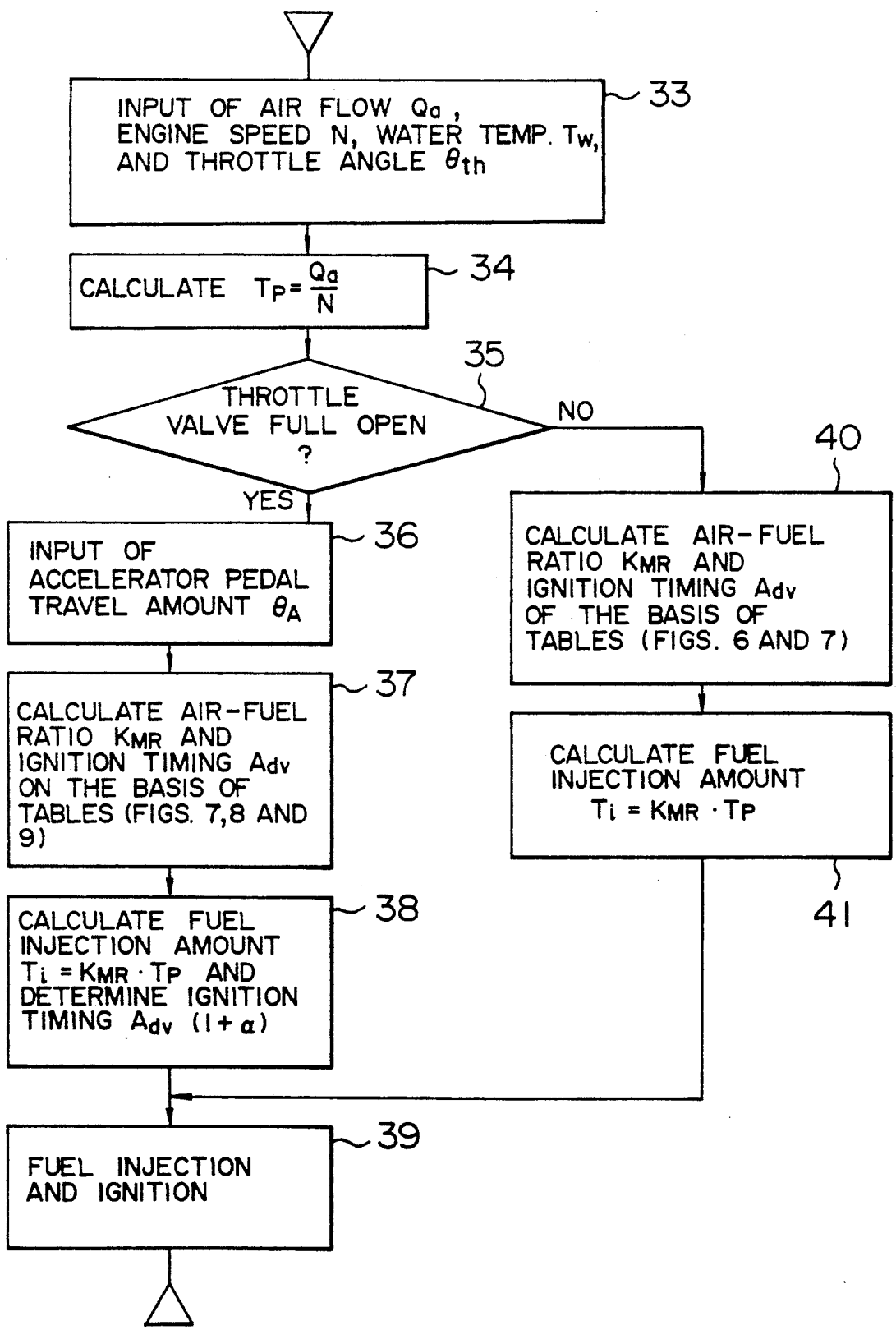
FIG. 5 is a flowchart showing the process of a method of this invention carried out by using the system.
Figure 6:
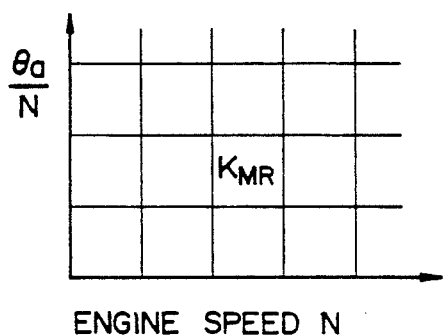
FIG. 6, 7, 8, and 9 are respectively examples of a table for deciding an air-fuel ratio, a table for deciding ignition timing. another table for deciding the air-fuel ratio, and a table for correcting ignition timing.
Figure 7:
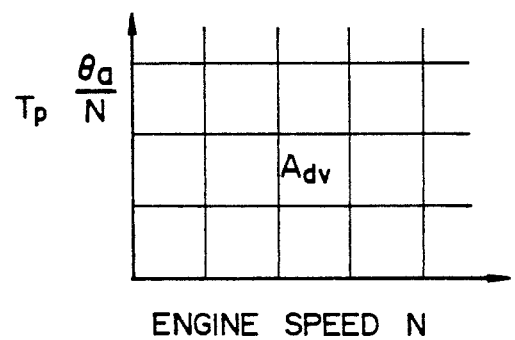
Figure 8:
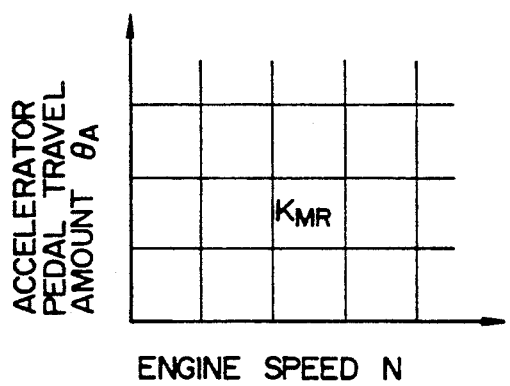

To begin with, at the step 33 of FIG. 5, the controller 5 receives an intake air flow $Q_a$ (or an intake pressure $P_b$), engine speed N, cooling water temperature $T_w$, and throttle opening angle $\theta_{th}$, and at the step 34, calculates a basic fuel injection amount $T_p$ from the intake air flow $Q_a$ and the engine speed N.

$$T_p = \frac{Q_a}{N}$$

Next, at the step 35, a decision is made whether or not the throttle valve 4 is fully opened. For this decision, either a decision method by judging whether the detected value of the throttle opening angle indicator 9 has exceeded a predetermined value or a decision method by a full-open detection signal from a full-open switch (not shown) which detects only a full-open state of the throttle valve 4.

If the decision result is that the throttle valve 4 is not fully opened, the accelerator pedal travel amount of FIG. 2B is in the range of O to $\theta_{AW}$. In this case, at the step 40, an air-fuel ratio $K_{MR}$ to be set is read from a two-dimensional table of engine speed and $Q_a/N$, shown in FIG. 6, and ignition timing Adv is read from a two-dimensional table of engine speed N and $Q_a/N$, shown in FIG. 7. In addition, at the step 41, an actual fuel injection amount $T_i$ is obtained from the following equation.

$$T_i = K_{MR} \cdot T_p$$

An output signal regarding an actual fuel injection amount $T_i$ obtained at the step 41 is sent from the output circuit 30 shown in FIG. 4 to the fuel injection system 6. An output signal regarding ignition timing Adv obtained at the step 40 is sent from the output circuit 29 shown in FIG. 4 to the ignition system 7. Therefore, in the operation range from the fullclosed state to the full-open state of the throttle valve 4, the controller 5 decides a fuel injection amount based on the intake air flow $Q_a$ and the engine speed N, and sends a command as an output signal to the fuel injection system 6 directing it to supply a lean mixture in the range from a low opening angle to a medium opening angle of the throttle valve.

On the other hand, if at the step 35, a decision is made that the throttle valve 4 is fully opened, the accelerator pedal travel amount of FIG. 2B is in the range from $\theta_{AW}$ to the maximum value. In this case, at the step 36, an accelerator pedal travel amount $\theta_A$ is input into the controller 5 from the accelerator pedal sensor 10, and at the step 37, an air-fuel ratio $K_{MR}$ to be set and ignition timing Adv are obtained. The set air-fuel ratio $K_{MR}$ is read from a two-dimensional table of engine speed N and accelerator pedal travel amount $\theta_A$, shown in FIG. 8. The ignition timing Adv is read from a two-dimensional table of engine speed N and $Q_a/N$, shown in FIG. 7.

Figure 9:
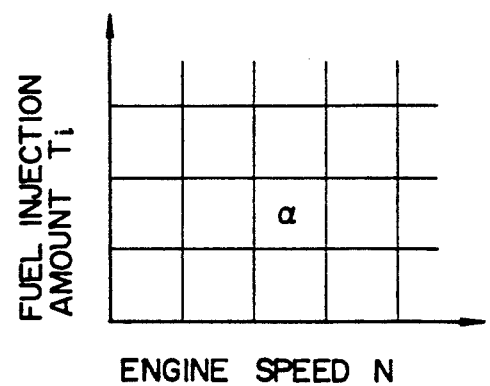

Then, at the step 38, an actual fuel injection amount $T_i$ ($T_i = K_{MR} \cdot T_P$) and a correction value $\alpha$ of ignition timing are read from a two-dimensional table of engine speed N and fuel injection amount $T_i$, shown in FIG. 9. And, the ignition timing $Adv(1+\alpha)$ added with the correction value o is calculated, and at the step 39, the actual fuel injection amount $T_i$ is output from the output circuit 30 of FIG. 4 to the fuel injection system 6, and the ignition timing Adv added with the correction value a is output from the output circuit 29 of FIG. 4 to the ignition system 7. Whereupon, a command as an output signal is given to the fuel injection system 6 directing it to increase the proportion of fuel in the mixture according to the accelerator pedal travel amount $\theta_A$ and supply a rich mixture in the operation range in which the throttle valve 4 is fully opened.

Figure 10A:
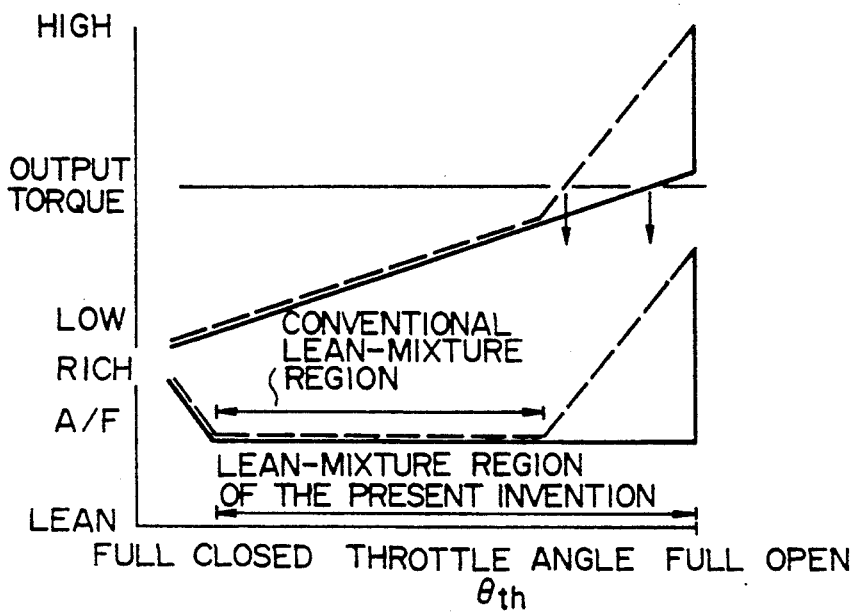
FIGS. 10A and 10B are diagrams showing a relation between an air-fuel ratio decided by the method of this invention and a generated torque with this air-fuel ratio, as compared with those by the prior art.
Figure 10B:
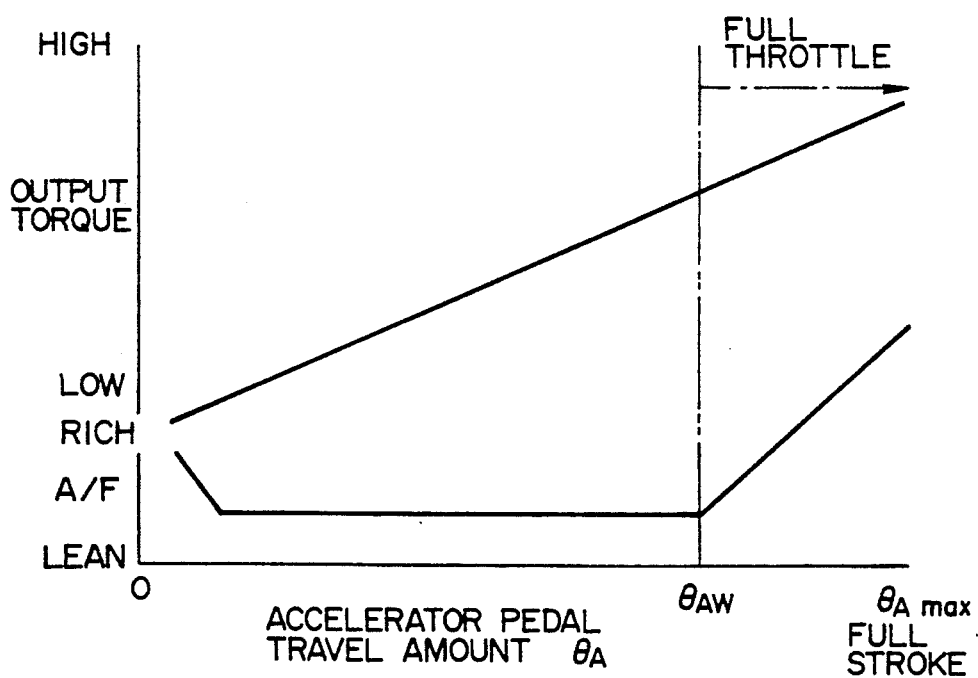

FIG. 10A is a diagram showing a relation among the throttle opening angle, air-fuel ratio (A/F), and the generated torque at this air-fuel ratio in the control method of this invention, as compared with those by the prior art. FIG. 10B shows a relation among the accelerator pedal travel amount, air-fuel ratio, and generated torque.

In the prior art, which has an arrangement that when the accelerator pedal travel amount $\theta_A$ is maximum, the throttle valve is fully opened, and as indicated by broken lines in FIG. 10A, the decided air-fuel ratio A/F changes in such a manner that a richer mixture is supplied gradually to obtain the generated torque which is substantially proportional to the throttle opening angle in the operation range from a point of a medium opening angle until the throttle valve is fully opened, and a rich mixture is supplied to develop the maximum generated torque when the throttle valve is full open. Therefore, the lean mixture supply range is narrow in the prior art.

In contrast, by the internal combustion engine control method according to this invention, as shown in FIGS. 2B and 10B, the throttle valve is arranged to be fully opened at $\theta AW$ before the accelerator travel amount $\theta_A$ becomes maximum. Therefore, as indicated by solid lines in FIG. 10A, a lean mixture is supplied in the operation range from a low opening angle until just before the full-open state of the throttle valve. After the throttle valve 4 is fully opened, if the accelerator pedal is depressed down further, the accelerator pedal can be depressed to the maximum amount, while the throttle valve is wide open. Therefore, by the internal combustion engine control method according to this invention, the range where a lean mixture is supplied can be expanded, and fuel consumption can be reduced, accordingly.

In the operation range where the accelerator pedal 8 is depressed down after the throttle valve 4 is fully opened, according to an accelerator pedal travel amount $\theta_A$, a proportion of fuel in the mixture is increased to obtain a richer mixture. Therefore, if the air-fuel ratio A/F at the maximum value $\theta_{Amax}$ of the accelerator pedal travel amount $\theta_A$ is made equal to the air-fuel ratio A/F when the throttle valve is full open in the prior art, the maximum generated torque or the maximum power by the control method of this invention and that by the prior art can be made equal. In other words, when the same generated torque is developed by the control method of this invention as by the prior art, the throttle opening angle is greater in the control method of this invention, so that the pumping loss of the engine is smaller and the engine efficiency is higher.

Figure 11:
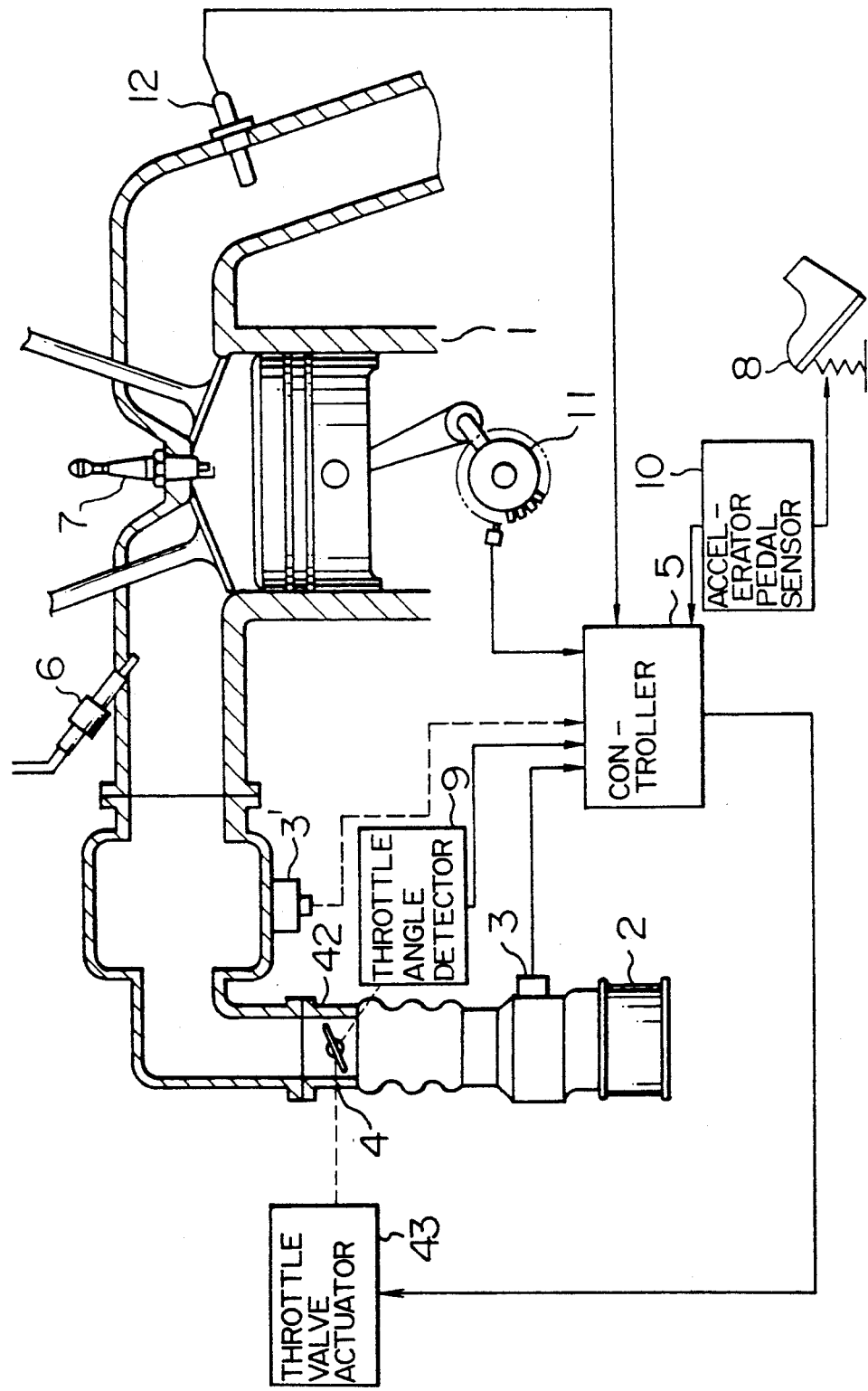
FIG. 11 is a system diagram, partly in cross section, showing another embodiment of the system for carrying out the method of this invention.
Figure 12:
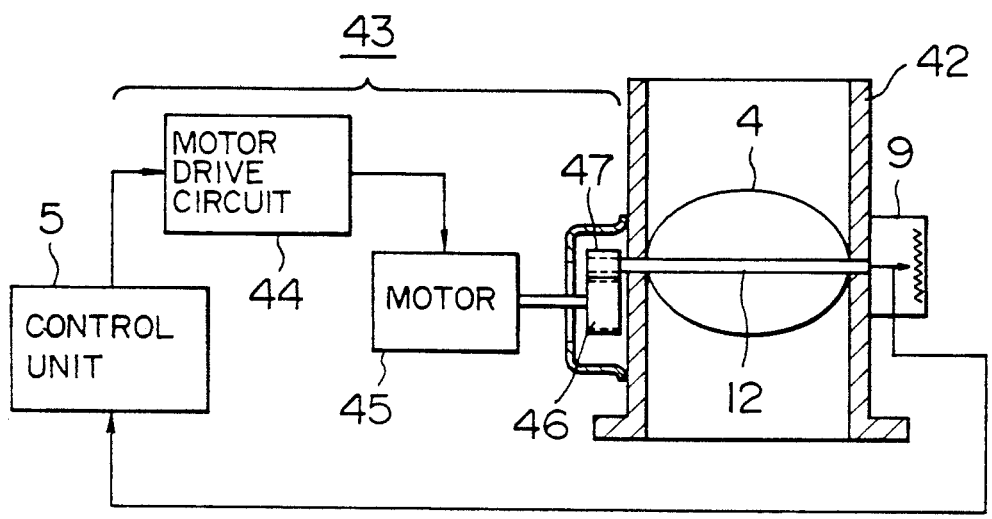
FIG. 12 is a system diagram showing detail of the throttle valve drive system in the embodiment of FIG. 11.

FIG. 11 is a system diagram, partly in cross section, showing another embodiment of the system for carrying out the internal combustion engine control method of this invention. FIG. 12 is a system diagram showing detail of the throttle valve drive system in the embodiment of FIG. 11.

In this other embodiment, instead of the mechanical throttle valve drive mechanism in the embodiment of FIG. 1, a throttle valve actuator 43 is connected to the controller 5 as shown in FIG. 11.

As FIG. 12 shows, the throttle valve actuator 43 comprises a motor driver circuit 44 and a motor 45. A drive gear 46 is attached to an output shaft of the motor 45. On the other hand, a driven gear 47 is attached to the valve shaft 12 of the throttle valve 4, and this driven gear 47 engages with the drive gear 46.

In this other embodiment, an accelerator pedal travel amount $\theta_A$ is input into the controller 5. By an output signal of the controller 5, a motor control circuit 44 of the throttle valve actuator 43 is controlled.

The motor drive circuit 44 drives the motor 45, which motor drives, through the drive gear 46 and the driven gear 47, the throttle valve 4 in the same manner as the characteristics in FIG. 2B, that is, the throttle valve 4 opens and closes according to the accelerator pedal travel amount $\theta_A$ until the throttle valve 4 is fully opened, and after the throttle valve is fully opened, the accelerator pedal 8 can be depressed with the throttle valve 4 staying open.

This embodiment provides an effect that the relation between the accelerator pedal travel amount $\theta_A$ and the throttle opening angle $\theta_{th}$ can be adjusted arbitrarily by changing the software of the controller 5.

The construction of the parts other than those described above, the operation and the effect of this other embodiment shown in FIGS. 11 and 12 are the same as those of the embodiment shown in FIGS. 1 to 10.

Description will next be made of still another embodiment of this invention. FIG. 13 shows the whole of the system according to this other embodiment. The parts of this embodiment which are designated by the same reference numerals as those of FIGS. 1 and 11 are the same constituent elements of this invention, and therefore, are not described again.

In FIG. 13, an EGR control device is added to the system of FIG. 1. As described earlier, EGR is effective in decreasing NOx, a harmful ingredient of the exhaust gas. Furthermore, the execution of EGR at the same time requires the throttle valve to be opened to a greater opening angle to develop the same output torque than in the case where EGR is not performed.

The wider throttle opening angle reduces a pumping loss of the engine and improves the engine efficiency. An EGR control device 50 is provided in the middle of a passage 56 communicating between an exhaust pipe 53 and an intake pipe 55. The EGR control device 50 comprises a metering part 52, which is driven by a motor 50. In response to an EGR amount signal from the controller 5, the motor 51 adjusts the metering part 52 according to the EGR amount signal, thereby changing a cross section of the passage 56 to supply a predetermined EGR quantity to the intake pipe 55.

Description will now be made of the operation of the embodiment of FIG. 13.

Figure 14:
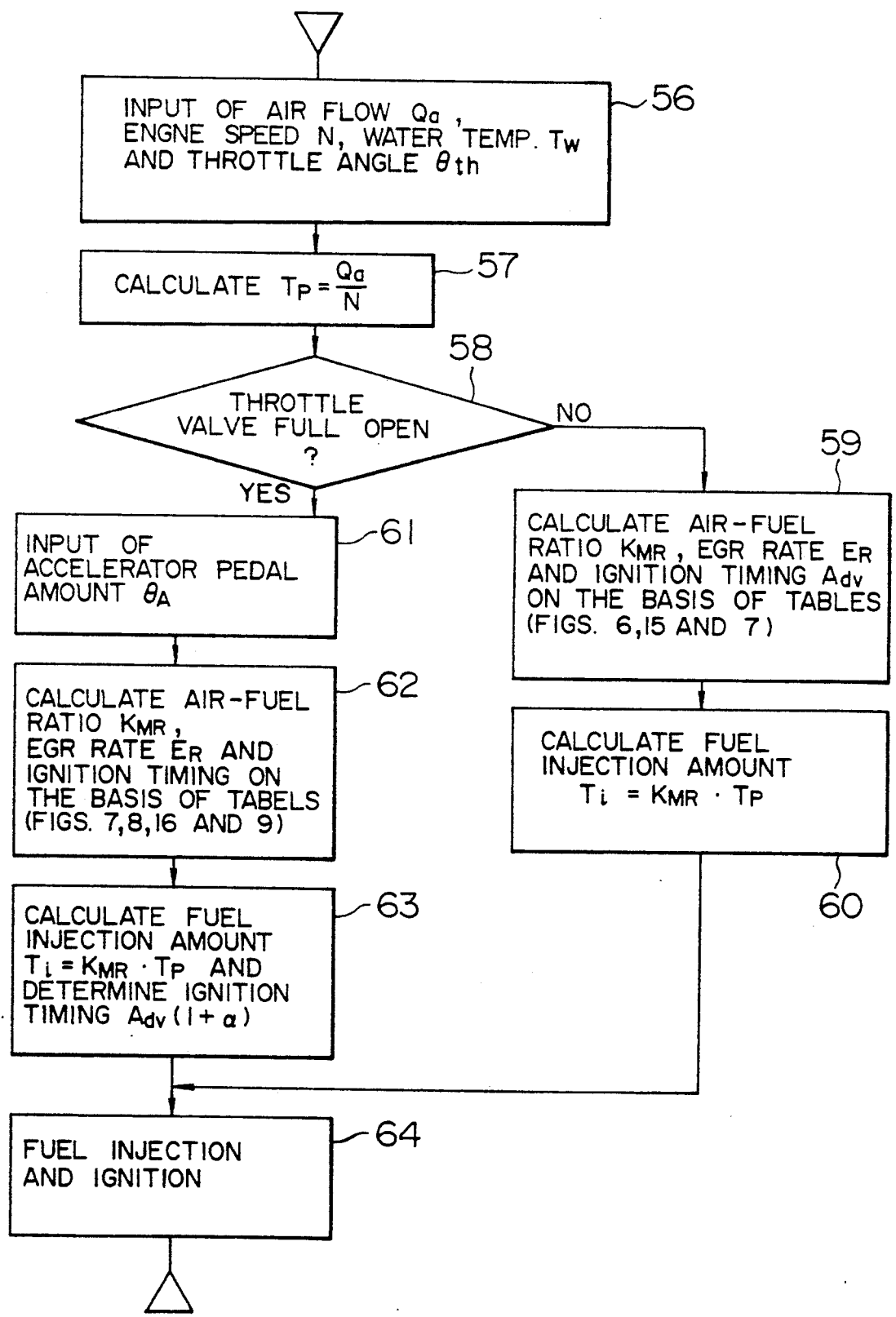
FIG. 14 is a control flowchart of the embodiment of FIG. 13.

At the step 56 in FIG. 14, the controller 5 receives an intake air flow $Q_a$ (or an intake pressure $P_b$), engine speed N, cooling water temperature $T_w$, and throttle opening angle $\theta_{th}$, and at the step 57, calculates a basic fuel injection amount $T_p$ from the intake air flow $Q_a$ and the engine speed N.

$$T_p = \frac{Q_a}{N}$$

Next, at the step 58, a decision is made whether or not the throttle valve is full open. For this decision, either a decision method by judging whether the detected value of the throttle opening angle indicator 9 has exceeded a predetermined value or a decision method by a full-open detection signal from a full-open switch (not shown) which detects only a full-open state of the throttle valve 4.

Figure 15:
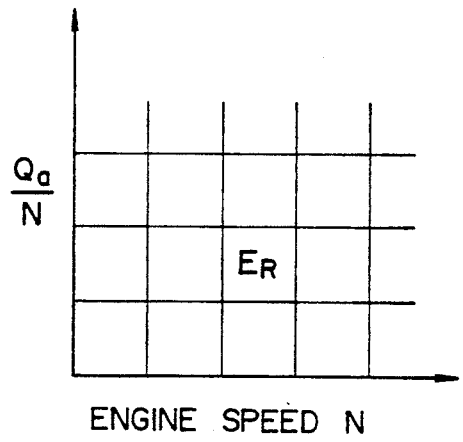
FIGS. 15 and 16 are EGR rate maps used in the control flow of FIG. 14.

If the decision result is that the throttle valve 4 is not fully opened, the accelerator pedal travel amount of FIG. 2B is in the range of 0 to $\theta_{AW}$. In this case, at the step 59, an air-fuel ratio $K_{MR}$ to be set is read from a two-dimensional table of engine speed and $Q_a/N$, shown in FIG. 6, and ignition timing Adv is read from a two-dimensional table of engine speed N and $Q_a/N$, shown in FIG. 7, and then, an EGR rate $E_R$ is read from a table of FIG. 15. In addition, at the step 60, an actual fuel injection amount $T_i$ is obtained from the following equation.

$$T_i = K_{MR} \cdot T_p$$

An output signal regarding an actual fuel injection amount $T_i$ obtained at the step 60 is sent from the output circuit 30 shown in FIG. 4 to the fuel injection system 6. An output signal regarding ignition timing Adv obtained at the step 59 is sent from the output circuit 29 shown in FIG. 4 to the ignition system 7. Therefore, in the operation range from the fully-closed state to the full-open state of the throttle valve 4, the controller decides a fuel injection amount based on the intake air flow $Q_a$ the engine speed N, and sends a command as on output signal to the fuel injection system 6 directing it to supply a mixture of a stoichiometric air-fuel ratio in the range from a low opening angle to a medium opening angle of the throttle valve.

Figure 16:
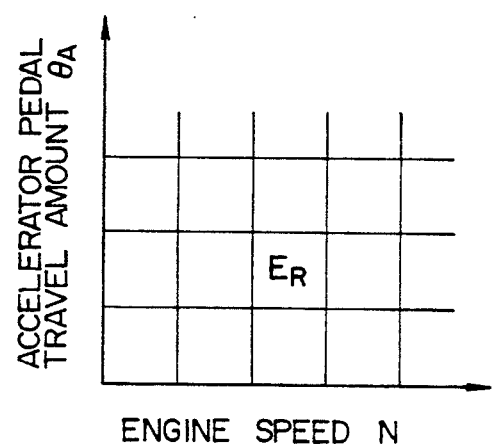

On the other hand, if at the step 58, a decision is made that the throttle valve 4 is fully opened, the accelerator pedal travel amount of FIG. 2B is in the range from $\theta_{AW}$ to the maximum value. In this case, at the step 61, an accelerator pedal travel amount $\theta_A$ is input into the controller 5 from the accelerator pedal sensor 10, and at the step 62, an air-fuel ratio $K_{MR}$ to be set and ignition timing Adv are obtained. The set air-fuel ratio $K_{MR}$ and EGR rate $E_R$ are read from two-dimensional tables of engine speed N and accelerator pedal travel amount $\theta_A$ shown in FIGS. 8 and 16. The ignition timing Adv is read from a two-dimensional table of engine speed N and $Q_a/N$, shown in FIG. 7.

Then, at the step 63, an actual fuel injection quantity $T_i$ ($T_i = K_{MR} \cdot T_P$) and a correction value $\alpha$ of ignition timing are read from a two-dimensional table of engine speed N and fuel injection amount $T_i$, shown in FIG. 9. And, the ignition timing Adv $(1+\alpha)$ added with the correction value a is calculated, and at the step 64, the actual fuel injection amount $T_i$ is output from the output circuit 30 of FIG. 4 to the fuel injection system 6, and the ignition timing Adv added with the correction value $\alpha$ is output from the output circuit 29 of FIG. 4 to the ignition system 7. Whereupon, a command as an output signal is given to the fuel injection system 6 directing it to increase the proportion of fuel in the mixture according to the accelerator pedal travel amount $\theta_A$ and supply a rich mixture in the operation range in which the throttle valve 4 is fully opened.

Figure 17A:
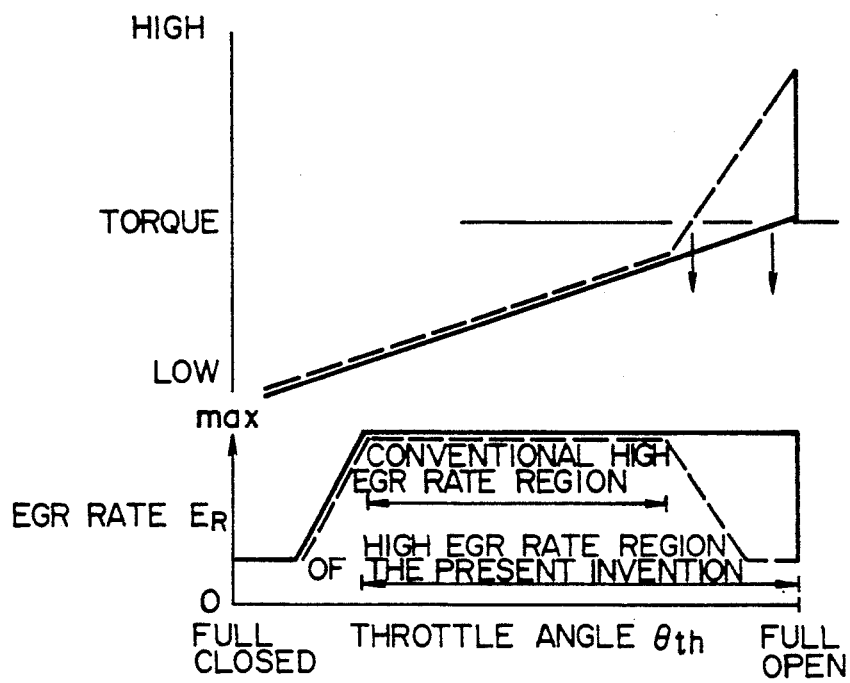
FIGS. 17A and 17B are diagrams which compare EGR rate control by this invention and by the conventional method.
Figure 17B:
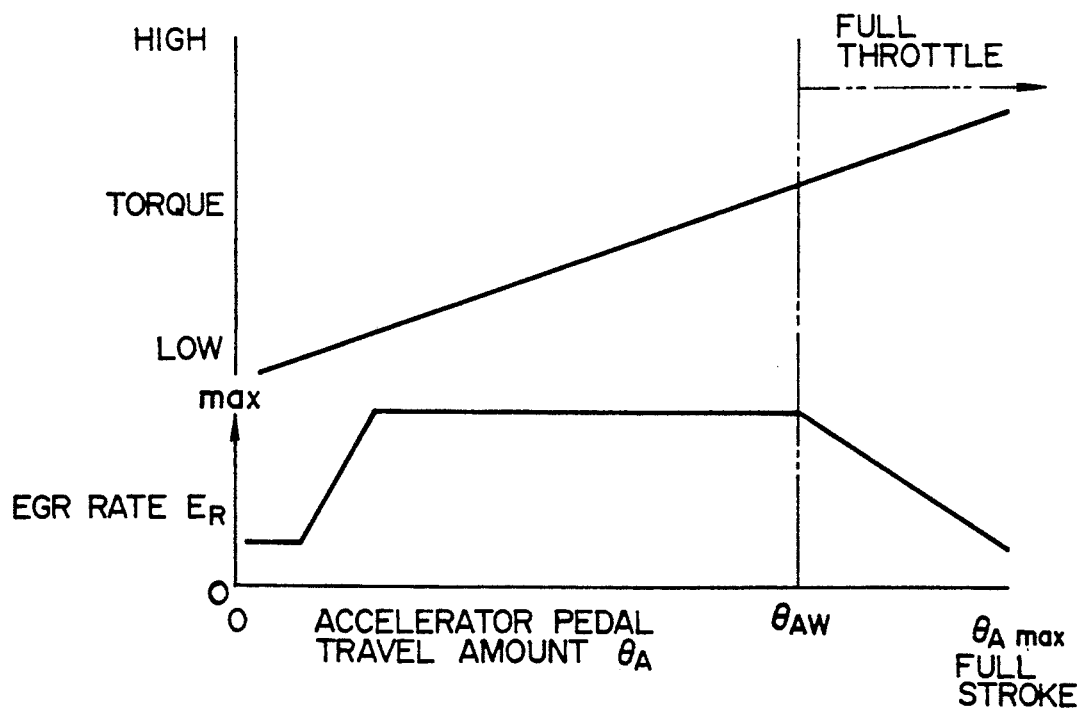

FIG. 17A is a diagram showing a relation among the throttle opening angle, EGR rate $E_R$, and the generated torque at this air-fuel ratio in the control method of this invention. FIG. 17B shows a relation among the accelerator pedal travel amount, EGR rate $E_R$, and generated torque.

In the prior art, which has an arrangement that when the accelerator pedal travel amount $\theta_A$ is maximum, the throttle valve is fully opened, and as indicated by broken lines in FIG. 17A, the decided EGR rate $E_R$ is set such that the EGR control device 50 is controlled to have a constant EGR rate relative to the throttle opening angle in the operation range from a point of a low opening angle to a half-open state, and the EGR rate is gradually reduced while the throttle valve changes from the half-open state to the full-open state, and reduced to zero when the throttle valve is wide open. Therefore, the operation range with EGR executed additionally is narrow in the prior art.

In contrast, by the internal combustion engine control method according to this invention, as shown in FIGS. 2B and 10B, the throttle valve is arranged to be fully opened at $\theta_{AW}$ before the accelerator travel amount $\theta_A$ becomes maximum. Therefore, as indicated by solid lines in FIG. 17A, the EGR rate is made constant in the operation range from a low opening angle till just before the full-open state of the throttle valve 4. After the throttle valve 4 is fully opened, if the accelerator pedal is depressed down further, the accelerator pedal can be depressed to the maximum amount, while the throttle valve 4 is wide open. Thus, in this embodiment, the EGR range can be expanded, and NOx and fuel consumption can be reduced, accordingly.

In the operation range where the accelerator pedal 8 is depressed down further after the throttle valve 4 is fully opened, according to an accelerator pedal travel amount $\theta_A$, the EGR rate is decreased, and the EGR rate is reduced to zero at the maximum accelerator travel amount of $\theta_{Amax}$.

According to this embodiment, NOx is reduced by expanding the EGR range and at the same time, the EGR rate is zero when the output is maximum, and also, fuel consumption can be reduced.

What is claimed is:

1. An internal combustion engine control method by which the engine output is controlled by controlling a throttle valve of an intake air passage by an accelerator pedal, comprising the steps of:

setting an operation of said throttle valve so that a throttle opening angle changes according to a travel amount of said accelerator pedal in the range from the minimum value to a predetermined value less than the maximum value of said accelerator pedal travel amount and that said throttle valve is in a full-open state in the range from said predetermined value to the maximum value of said accelerator pedal travel amount;

supplying an air-fuel mixture of a first air-fuel ratio in said throttle opening angle range corresponding to the range of said accelerator pedal travel amount from the minimum value until said predetermined value is reached; and supplying an air-fuel mixture of a second air-fuel ratio different from said first air-fuel ratio in said throttle opening angle range corresponding to the range of said accelerator pedal travel amount from said predetermined value to the maximum value.

2. The control method according to claim 1, wherein said step of supplying an air-fuel mixture of a first air-fuel ratio includes a step of determining said first air-fuel ratio based on a cylinder air flow and revolution number of said internal combustion engine, and said step of supplying an air-fuel mixture of a second air-fuel ratio includes a step of determining said second air-fuel ratio based on said accelerator pedal travel amount and said revolution number of said internal combustion engine.

3. The control method according to claim 2, wherein, in said steps of determining said first air-fuel ratio and said second air-fuel ratio, said first air-fuel ratio is set on the leaner side than said second air-fuel ratio.

4. The control method according to claim 3, wherein, in said step of determining said first air-fuel ratio, said first air-fuel ratio is determined by referring to a first map indicating values of the air-fuel ratios in various ranges which are determined on the basis of values of intake air flow per engine revolution and the number of engine revolutions, and in said step of determining said second air-fuel ratio, said second air-fuel ratio is determined by referring to a second map indicating values of the air-fuel ratios in various ranges which are determined on the basis of values of said accelerator pedal travel amount and the number of engine revolutions.

5. The control method according to claim 4, wherein said steps of supplying air-fuel mixtures of said first and second air-fuel ratios includes a step of determining values of fuel flows on the basis of values of intake air flow per engine revolution and values of said first and second air-fuel ratios.

6. The control method according to claim 5, further including the steps of:

determining a basic ignition timing based on said cylinder air flow and said engine revolution number in a range of the throttle opening angles corresponding to a range of the accelerator pedal travel amounts between a minimum value and said predetermined value;

determining an ignition timing by adding a correction value to said basic ignition timing in a range of the throttle opening angles corresponding to a range of the accelerator pedal travel amounts between said predetermined value and a maximum value; and determining said correction value based on said fuel flow and the number of engine revolution.

7. The control method according to claim 1, further comprising the steps of:

deciding an exhaust gas recirculation amount based on said cylinder air flow and engine speed of the internal combustion engine in said throttle opening angle range corresponding to the range of accelerator pedal travel amount from the minimum value to said predetermined value; and deciding said EGR amount based on said accelerator pedal travel amount and said engine speed in said throttle opening angle range corresponding to the range of said accelerator pedal travel amount from said predetermined value to the maximum value.

8. The control method according to claim 7, wherein step of supplying an air-fuel mixture of a first air-fuel ratio includes a step of determining said first air-fuel ratio based on cylinder air flow and revolution number of the internal combustion engine, and said step of supplying an air-fuel mixture of a second air-fuel ratio includes a step of determining said second air-fuel ratio based on said accelerator pedal travel amount and said revolution number of the internal combustion engine.

9. An internal combustion engine control apparatus by which the engine output is controlled by controlling a throttle valve of an intake passage by an accelerator pedal, comprising:

means for detecting an accelerator pedal travel amount;

means for detecting a throttle opening angle;

means for driving said throttle valve, arranged between said accelerator pedal and said throttle valve and set such that said throttle opening angle changes according to said accelerator pedal travel amount in a first range of said accelerator pedal travel amount from the minimum value to a predetermined value less than the maximum value, and that said throttle valve is in a full-open state in a second range of said accelerator pedal travel amount from said predetermined value to the maximum value;

means for deciding from a detected value of throttle opening angle whether or not said throttle valve is full open; and fuel supply apparatus for supplying an air-fuel mixture of a first air-fuel ratio when a decision is made that said throttle valve is not full open, and supplying an air-fuel mixture of a second air-fuel ratio different from said first air-fuel ratio when a decision is made that said throttle valve is full open.

10. The control apparatus according to claim 9, wherein said fuel supply apparatus comprises means for measuring a cylinder air flow of said engine, means for measuring said engine speed, and means for deciding said first air-fuel ratio based on said cylinder air flow and engine speed of the internal combustion engine, and deciding said second air-fuel ratio based on said accelerator pedal travel amount and engine speed.

11. The control method according to claim 9, further comprising an exhaust gas recirculation passage connecting between an exhaust pipe and an intake pipe of said engine, an EGR valve for controlling an exhaust gas recirculation flow in the said exhaust gas recirculation passage, and means for deciding the EGR flow based on said cylinder air flow and engine speed of the internal combustion engine, and deciding the EGR flow based on said accelerator pedal travel amount and engine speed.

12. The control apparatus according to claim 11, wherein said fuel supply apparatus comprises means for measuring an intake air flow of said engine, means for measuring said engine speed, and air-fuel ratio deciding means for deciding said first air-fuel ratio based on said cylinder air flow and engine speed of said engine, and deciding said second air-fuel ratio based on said accelerator pedal travel amount and engine speed.

13. The control apparatus according to claim 10, wherein said throttle valve drive means is a mechanism mechanically connecting said accelerator pedal and said throttle valve.

14. The control apparatus according to claim 10, wherein said throttle valve drive means comprises a mechanical displacement/electric signal converting means for converting said accelerator pedal travel amount into an electric signal, and an electric signal/-mechanical displacement converting means for driving said throttle valve according to a value of said electric signal.

15. The control apparatus according to claim 10, wherein there are further provided means for calculating a value of a basic fuel supply amount from said engine speed and cylinder air flow, means for calculating an actual fuel supply amount from said first or second air-fuel ratio and said basic fuel supply amount, and means for deciding a basic ignition timing based on said actual fuel supply amount and said engine speed, wherein said means for deciding the ignition timing decides an actual ignition timing by adding a correction value to said basic ignition timing, said correction value being decided based on said actual fuel supply amount and said engine speed.

* * * * *